(12) United States Patent
Russell et al.

(10) Patent No.: US 9,495,851 B1
(45) Date of Patent: Nov. 15, 2016

(54) TAG-BASED PRODUCT MONITORING AND EVALUATION

(71) Applicant: Amazon Technologies, Inc., Seattle, WA (US)

(72) Inventors: Ryan Scott Russell, Bellevue, WA (US); Thomas Matthew Ryle, Olympia, WA (US); Wesley Scott Lauka, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 46 days.

(21) Appl. No.: 14/552,982

(22) Filed: Nov. 25, 2014

(51) Int. Cl.
G08B 13/14 (2006.01)
G08B 13/24 (2006.01)

(52) U.S. Cl.
CPC .................................. *G08B 13/2402* (2013.01)

(58) Field of Classification Search
None
See application file for complete search history.

(56) References Cited

U.S. PATENT DOCUMENTS

| 7,876,222 | B2 | 1/2011 | Calvarese | |
|---|---|---|---|---|
| 8,318,111 | B2 | 11/2012 | Mingerink et al. | |
| 2004/0100380 | A1* | 5/2004 | Lindsay | G06K 19/0717 340/540 |
| 2005/0258961 | A1* | 11/2005 | Kimball | G06Q 20/203 340/572.1 |
| 2007/0008121 | A1 | 1/2007 | Hart | |
| 2007/0258048 | A1* | 11/2007 | Pitchers | G06K 17/00 353/26 R |
| 2010/0109852 | A1* | 5/2010 | Bauchot | G06Q 10/06 340/10.51 |
| 2015/0294126 | A1 | 10/2015 | Colby | |

* cited by examiner

*Primary Examiner* — Travis Hunnings
(74) *Attorney, Agent, or Firm* — Thomas Horstemeyer, LLP; Michael J. D'Aurelio; Jason M. Perilla

(57) ABSTRACT

Aspects of tag-based product monitoring and evaluation are described. In one embodiment, a system instructs a tag reader to transmit an electromagnetic field and receives a plurality of unique identifiers for a plurality of products from a plurality of tags in response to the electromagnetic field. The plurality of tags may be provided on a plurality of product packages for the plurality of products. The system also identifies the plurality of products using the plurality of unique identifiers and identifies whether a product package of at least one of the plurality of products has been opened based on the plurality of unique identifiers or the product detail data. The system may alert a user as to whether one or more product packages have been opened before purchasing.

26 Claims, 12 Drawing Sheets

TAG-BASED PRODUCT MONITORING AND EVALUATION

BACKGROUND

Radio frequency identification (RFID) tags are used in various applications, such as item location and/or identification, theft prevention, data gathering, etc. In some cases, RF identification tags electronically store information. An RF identification tag may be powered by electromagnetic induction from an electromagnetic field produced by a tag reader or from a battery, for example. Generally, when excited by an electromagnetic field, an RF identification tag may reply with a unique identifier and/or other data from the tag.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

According to the embodiments described herein, RF identification tags (i.e., "identification tag(s)" or "tag(s)") may be affixed to, incorporated with, provided on, or otherwise used with product packages to sense or gather information about the packages and products associated with the packages. This information may identify whether the products or packages have been opened, tampered with, damaged, exposed to relatively extreme environmental conditions (e.g., extreme temperatures, levels of humidity, levels of atmospheric pressure, etc.) or handling (e.g., sudden impact or change in velocity or acceleration, weight, shear or torsion stress, etc.), for example, among other types of information. This information may be useful as an indicator of the quality, state, or safety of the products stored within the packages. In the context of a food supermarket, for example, if a tag provides an indication at the checkout that a product package for a certain product has been opened before it is purchased, the purchaser may be alerted to this information and provided the opportunity to select a different product with an intact (e.g., unopened, sealed, untampered, etc.) package.

Figure 1:
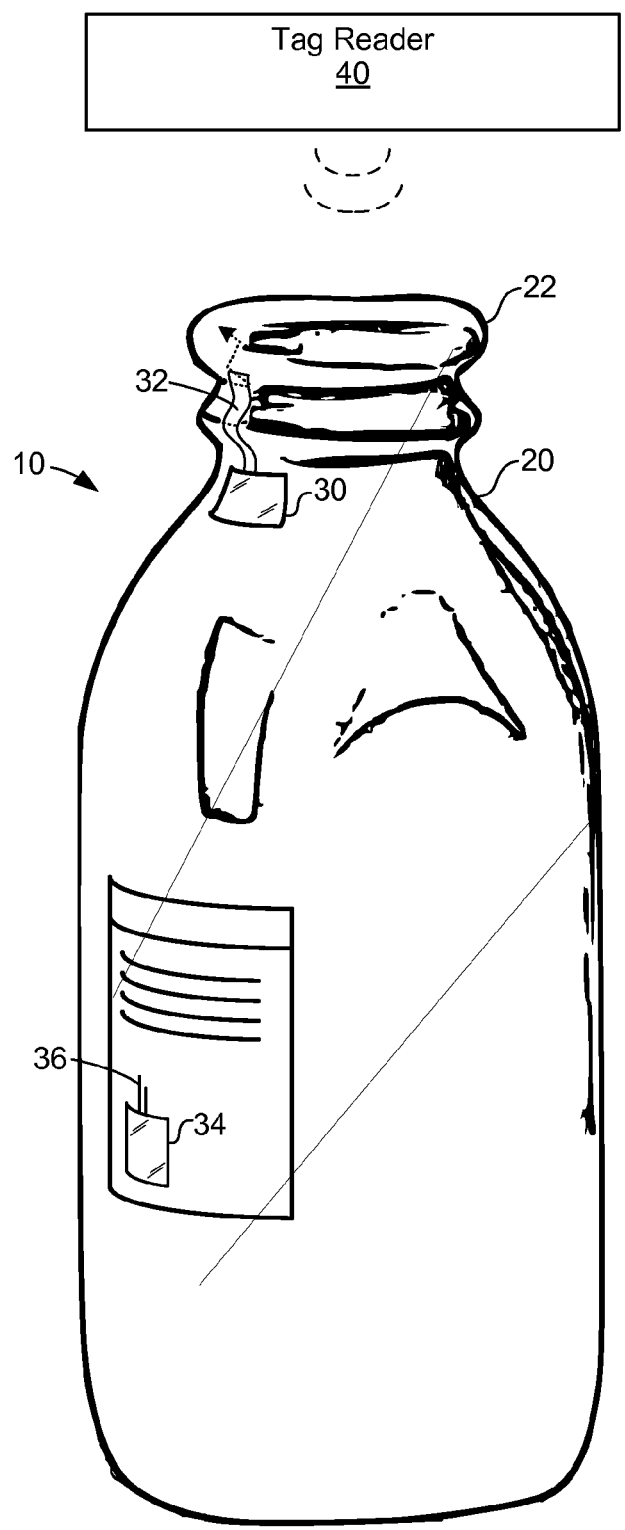
FIG. 1 illustrates a product package including identification tags according to various embodiments of the present disclosure.

In this context, FIG. 1 illustrates a product package 10. In FIG. 1, the product package 10 is embodied as a bottle 20 including tags 30 and 34. One or both of the tags 30 and 34 may be integrated with or provided on the product package 10 as a product label, a product labeling wrap, a tamper seal, an anti-theft tag, etc. Among other data, both tags 30 and 34 may store a unique identifier associated with the product package 10. It should be appreciated that the tags 30 and 34 (and others described herein) may be used with other types of product packages, such as cartons, boxes, re-sealable bags, etc., without limitation. Further, the systems and processes for tag-based monitoring and evaluation described herein may be conducted with packages for any type of product, including but not limited to food, cleaning, cosmetic, electronic, apparel, consumer, industrial, manufacturing, or other products, without limitation. Generally, while certain product packages are described and illustrated, the manner of use, application, and incorporation of tags with such product packages is not intended to be limiting of the scope of the embodiments.

The tags 30 and 34 may be configured to sense or gather information related to the state of the product package 10 and/or the contents or product within the product package 10 (e.g., water, milk, juice, etc.). The information may be sensed or gathered at one or more predetermined times, periodically over time, or continuously over time. The information may be stored in memory of the tags 30 and 34 and/or communicated to another computing environment for processing. As illustrated in FIG. 1 and described in further detail below, the tag reader 40 may read the unique identifier of the product package 10 along with other information from one or both of the tags 30 and 34. Particularly, the tag reader 40 may transmit an electromagnetic signal or field to excite, actuate, or direct one or both of the tags 30 and 34. In turn, the tags 30 and 34 may reply with an electromagnetic signal or field including their unique identifiers and/or other information associated with the product package 10. In various embodiments, the tags 30 and 34 may be excited, respectively, by electromagnetic fields having the same or different frequencies.

As further described below, the electromagnetic signal or field from the tag reader 40 may also direct one or both of the tags 30 and 34 to survey, test, evaluate, or otherwise monitor one or more conditions of the product package 10 and/or the contents within the product package 10. Additionally, the tag reader 40 may transmit an electromagnetic signal to direct one or both of the tags 30 and 34 to reply with information related to the state of the product package 10 and/or the contents within the product package 10. This information may be provided to a computing environment for further processing, as described below with reference to FIG. 6.

In FIG. 1, the tag 30 may be relied upon to determine whether a cap 22 of the product package 10 has been opened or removed. The cap 22 is provided as one example of an access covering of the bottle 20. In the illustrated embodiment, an antenna 32 of the tag 30 extends from the bottle 20 to the cap 22. In other embodiments, the tag 30 may be provided on the cap 22, and the antenna 32 may extend from the cap 22 to the bottle 20. After the bottle 20 is filled with a product and the cap 22 is secured to the bottle 20, the antenna 32 of the tag 30 is placed to extend from the bottle 20 to the cap 22. The tag 30 and antenna 32 may be affixed on or around the cap 22 using adhesive, tape, shrink wrap, a sticker, etc. Additionally or alternatively, the tag 30 and antenna 32 may be affixed on or around the cap 22 as part of a product label, a product wrap, a tamper seal, etc.

If the cap 22 is removed from the bottle 20, then the antenna 32 may be broken away from the tag 30, rendering the tag 30 incapable of operation. That is, if the antenna 32 is electrically disconnected from the tag 30, the tag 30 can no longer be excited or actuated by electromagnetic signals or fields from the tag reader 40. As such, the tag 30 cannot respond to the tag reader 40. However, even if the tag 30 cannot respond to the tag reader 40, the tag 34 may still respond to the tag reader 40. Thus, if the tag reader 40 receives a response including the unique identifier associated with the product package 10 from the tag 34 but not from the tag 30, the tag reader 40 (or another computing environment) may conclude that the cap 22 has been removed and/or that the product package 10 has been tampered with. This difference in whether both the tags 30 and 34 or only the tag 34 responds to the tag reader 40 may be considered to determine whether there is a confluence of signals from the tags 30 and 34. That is, if signals are confluent (e.g., substantially overlapping or both occurring substantially simultaneously) from both the tags 30 and 34, it may indicate that the cap 22 has not been removed. On the other hand, if signals are not confluent from both the tags 30 and 34, it may indicate that the cap 22 has been removed.

Figure 2A:
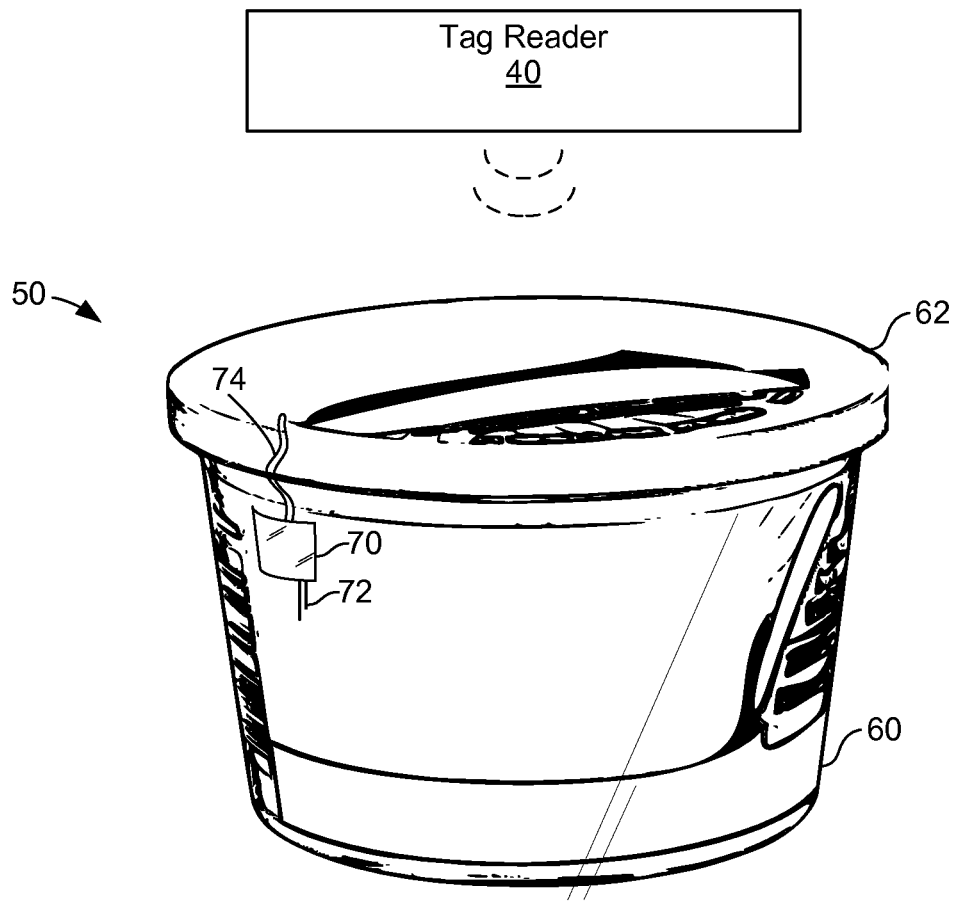
FIGS. 2A-C illustrate another product package including an identification tag according to various embodiments of the present disclosure.

As another example, FIG. 2A illustrates a product package 50. In FIG. 2A, the product package 50 is embodied as a tub 60 including a tag 70. The tag 70 may be integrated with or provided on the product package 50 as a product label, a product labeling wrap, a tamper seal, an anti-theft tag, etc. Among other data, the tag 70 may store a unique identifier associated with the product package 50 and product detail data associated with a product contained in the product package 50. The tag 70 may be configured to sense or gather information related to the state of the product package 50 and/or the product contained in the product package 50 (e.g., butter, yogurt, etc.). The information may be stored in a memory of the tag 70 and/or communicated to another computing environment for processing. For example, the tag reader 40 may transmit an electromagnetic signal or field to excite the tag 70 through the antenna 72. In turn, the tag 70 may reply with the unique identifier and/or other information associated with the product package 50.

The tag 70 may be relied upon to determine whether a lid 62 of the product package 50 has been opened or removed. The lid 62 is provided as one example of an access covering of the tub 60. In this embodiment, a continuity trace 74 of the tag 70 extends from the tub 60 to the lid 62. The continuity trace 74 may be affixed on or around lid 62 using adhesive, tape, shrink wrap, a sticker, etc. Additionally or alternatively, the continuity trace 74 may be affixed on or around the lid 62 as part of a product label, a product wrap, a tamper seal, etc. In this case, if the lid 62 is removed from the tub 60, then the continuity trace 74 may be broken away from the tag 70.

In response to an electromagnetic signal or field from the tag reader 40, the tag 70 may be configured to evaluate the continuity of the continuity trace 74, identify whether the lid 62 has been opened or tampered with based on the continuity, and reply to the tag reader 40 with information (i.e., data) related to whether the lid 62 has been opened or tampered with. Here, the evaluation may amount to a true/false determination of continuity in the continuity trace 74. In other words, if an electrical coupling provided by the continuity trace 74 is broken or interrupted, the tag 70 may identify that the lid 62 has been opened or tampered with. Alternatively, the tag 70 may be configured to evaluate whether the lid 62 has been opened or tampered with based on changes in one or more electrical characteristics of the continuity trace 74, such as changes in resistance and/or capacitance, for example. In contrast to the embodiment in FIG. 1, the product package 50 includes one tag 70 rather than two, and the tag 70 includes the continuity trace 74 to identify whether the lid 62 has been removed from the tub 60. In this embodiment, even after the lid 62 has been removed and the continuity trace 74 broken, the tag 70 may still respond when excited by an electromagnetic signal or field from the tag reader 40, because the tag 70 can reply by transmitting a signal using the antenna 72. Thus, in response to an electromagnetic signal or field transmitted from the tag reader 40, the tag 70 may reply with a unique identifier and/or other information associated with the product package 50 (e.g., information related to whether the lid 62 has been opened). In turn, another computing device or system (in addition to or other than the tag 70) may gather and process this information to provide various types of feedback as further described below. In certain embodiments, the tag 70 may be configured to evaluate the continuity of the continuity trace 74 before the tag 70 is excited by an electromagnetic signal from the tag reader 40. In this case, the tag 70 may store the result of the evaluation in a memory of the tag 70 and relay the result once excited by the electromagnetic signal.

In other aspects of the embodiments described herein, a tag may be configured to identify a date or timing (e.g., absolute or relative timing, time of day, calendar day, month, year, etc.) at which a product or product package was first opened. The tag may use this timing information to calculate a use-by or expiration date associated with the product, based on when the product was first opened. In this context, the tag may be further configured to provide a display of this use-by or expiration date, so that an individual can decide when to discard the product. Further, a tag may include one or more sensors, such as temperature, humidity, and/or movement sensors, and the tag may rely upon the sensors to monitor and evaluate the status or characteristics of a product package or product over time. Such information may be displayed by the tag or sensed or gathered by a tag reader, evaluated by a computing environment, and used to provide certain feedback. These and other aspects are described in further detail below.

Figure 2B:
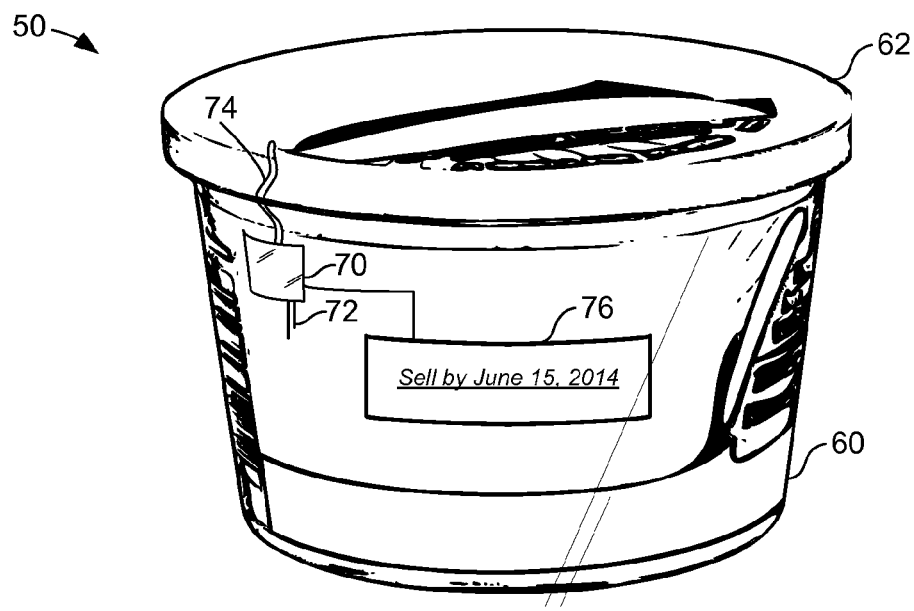
Figure 2C:
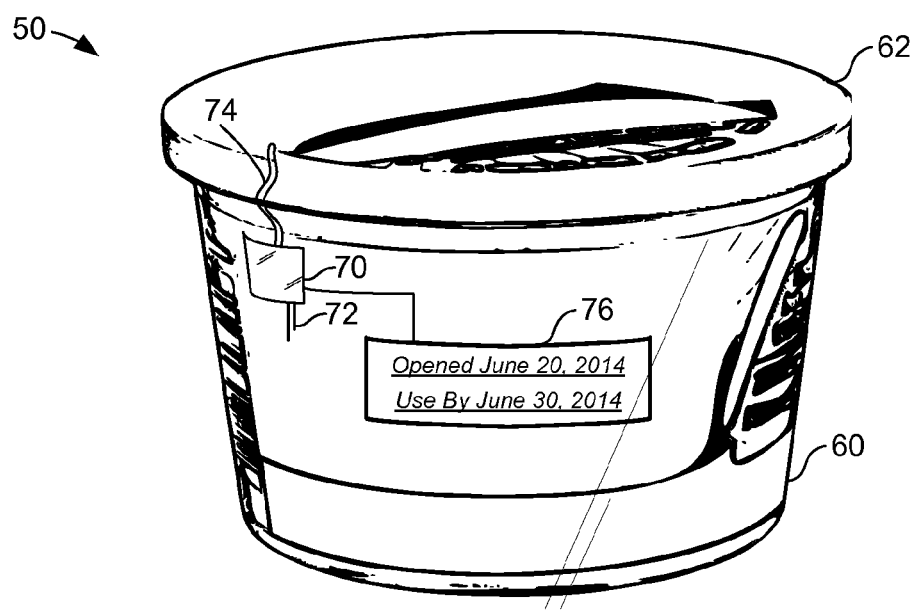

FIGS. 2B and 2C illustrate the product package 50 and the tag 70 from FIG. 2A. In FIGS. 2B and 2C, the tag 70 also includes a display 76 which is electrically coupled to the tag 70. In various embodiments, the display 76 may be integrated with or separate from the tag 70. The display 76 may be embodied as any suitable type of display device, such as an electronic ink or other display, as further described below with reference to FIG. 4. The display 76 may be electrically coupled to receive control signals from the tag 70 and be powered by a battery of the tag 70, for example. As further described below, the tag 70 may direct the display 76 to present various types of information related to the product package 50 or the product contained within the product package 50. In one aspect of the embodiments, the tag 70 may provide product detail or usage information on the display 76, such as sell-by date information as illustrated in FIG. 2B or opened-on and use-by date information as illustrated in FIG. 2C, for example. Using the display 76, the tag 70 may alert individuals to information about the product package 50 or a product contained in the product package 50.

Figure 3:
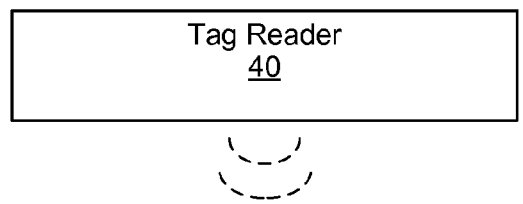
FIG. 3 illustrates another product package including an identification tag according to various embodiments of the present disclosure.
Figure 3:
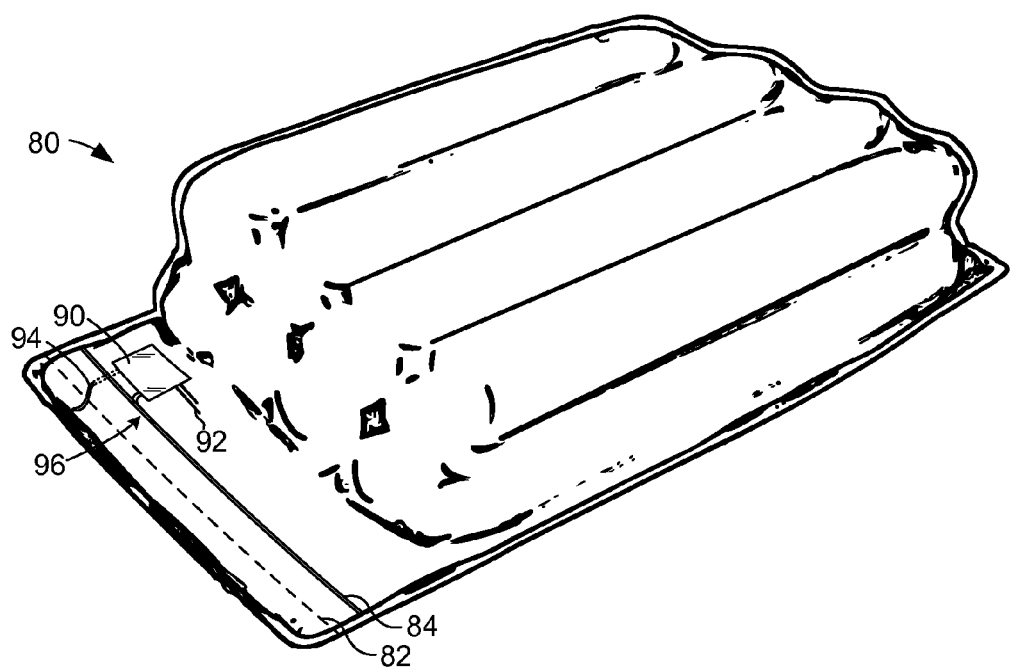

FIG. 3 illustrates another product package 80 including an identification tag 90 according to various embodiments of the present disclosure. As illustrated, the product package 80 is embodied as a shrink-wrap package. Among other data, the tag 90 may store a unique identifier and product detail data associated with a product contained in the product package 80. The tag 90 may be configured to sense or gather information related to the state of the product package 80 and/or the product contained in the product package 80 (e.g., hotdogs, sausages, etc.). The information may be stored in a memory of the tag 90 and/or communicated to another computing environment for processing. For example, the tag reader 40 may transmit an electromagnetic signal or field to excite the tag 90. In turn, the tag 90 may reply with a unique identifier and/or other information associated with the product package 80.

Similar to the embodiments described above with reference to FIGS. 1 and 2A, the tag 90 may be relied upon to determine whether the product package 80 has been opened. In this embodiment, a continuity trace 94 of the tag 90 extends out and across a perforated access edge 82 of the product package 80. If the perforated access edge 82 is removed (e.g., torn off or away) from the product package 80, then the continuity trace 94 may be broken away from the tag 90. In response to an electromagnetic signal or field from the tag reader 40, the tag 90 may be configured to evaluate the continuity of the continuity trace 94 and identify whether the perforated access edge 82 has been wholly or partly removed or tampered with. In other words, if an electrical coupling provided by the continuity trace 94 is broken or interrupted, the tag 90 may identify that the perforated access edge 82 has been opened or tampered with. In response to an electromagnetic signal or field from the tag reader 40, tag 90 may reply to the tag reader 40 with information (i.e., data) related to whether the perforated access edge 82 has been removed from the product package 80. In turn, another computing device or system (in addition to or other than the tag 90) may gather and process this information to provide various types of feedback as further described below.

The tag 90 also includes a continuity trace 96 incorporated with a re-sealable strip 84 of the product package 84. When the re-sealable strip 84 is opened, then the continuity trace 96 is also opened (i.e., continuity is broken). In other words, if an electrical coupling provided by the continuity trace 96 is open, broken, or interrupted, the tag 90 may identify that the re-sealable strip 84 has been opened. When the re-sealable strip 84 is closed, then the continuity trace 96 is also closed (i.e., continuity is re-established), and the tag 90 may identify that the re-sealable strip 84 has been re-closed. Thus, the tag 90 may be configured to evaluate the continuity of the continuity trace 96 over time to identify a number of times in which the re-sealable strip 84 has been opened and/or closed, the length of time during which the re-sealable strip 84 has been left open, etc. In response to an electromagnetic signal or field from the tag reader 40, tag 90 may reply to the tag reader 40 with information (i.e., data) related to whether the re-sealable strip 84 is or has been opened or a number of times the re-sealable strip 84 has been opened, for example. In turn, another computing device or system (in addition to or other than the tag 90) may gather and process this information to provide various types of feedback as further described below.

Here, it is noted that the ways in which the tags 30, 34, 70 and 90 are incorporated with the product packages 10, 50, and 80 in FIGS. 1, 2A-2C, and 3 are provided by way of example. Among embodiments, tags may be incorporated with product packages in various ways. That is, depending upon the type of the product package, the number of access openings to the product package, the type, size, and orientation of the access openings, etc., tags may be incorporated with, provided on, or applied to product packages in various ways to reliably detect opening or tampering. For example, various lengths and orientations of continuity traces may be relied upon depending upon the type of product package. Similarly, the number and type of sensors in a tag may vary depending upon the type of product package, the type of product contained in the product package, the type of information that is to be sensed or gathered about the product and/or the product package, etc.

Figure 4:
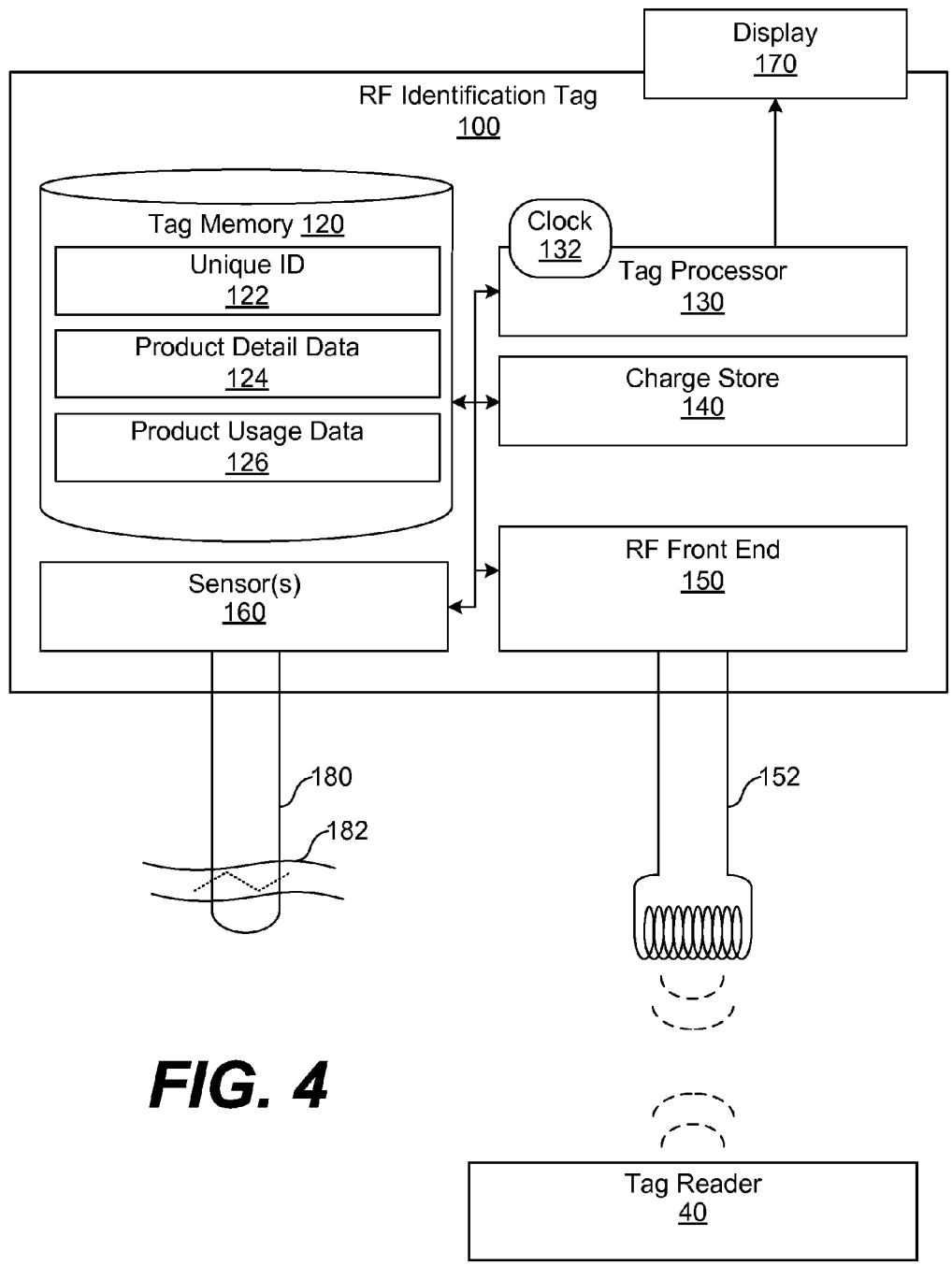
FIG. 4 illustrates an example block diagram of an RF identification tag which may incorporated with a product package according to various embodiments of the present disclosure.

FIG. 4 illustrates an example block diagram of an RF identification tag 100 which may be incorporated with a product package according to various embodiments of the present disclosure. Among other components, the tag 100 includes a tag memory 120, a tag processor 130, a charge store 140, an RF front end 150, one or more sensors 160, and a display 170. The tag 100 in FIG. 4 is provided by way of example of a tag which may be relied upon for tag-based product monitoring and evaluation as described herein. Because tag-based product monitoring and evaluation may vary among embodiments, one or more of the tags may vary in form and/or function depending upon the type of monitoring or evaluation required. For example, in variations, the tag 100 may omit certain elements or components, such as the sensors 160, the charge store 140, and/or the display 170.

The tag processor 130 may be embodied as a state machine, general or specific purpose processor, or processing circuit configured to direct the operations of the tag 100. In some embodiments, the tag processor 130 includes a clock 132. The clock 132 may be relied upon by the tag processor to track and identify a time and/or date at which certain events occur. The charge store 140 may be embodied as any suitable electric charge storage element, such as a capacitor or battery, for example. The charge store 140 may provide power for the operation of the tag 100 over time.

The RF front end 150 may be embodied as any suitable combination of front end circuitry elements for RF communications, including but not limited to one or more amplifiers, phase-locked loops, mixers, filters, slicers, etc. The RF front end 150 may be configured and/or tuned to operate at one or more frequencies or frequency ranges, such as 125 kHz-134.2 kHz, 13.56 MHz, 860 MHz-960 MHz, or 2.45 GHz, for example. Thus, the RF front end 150 may be excited and configured to receive data from, transmit data to, or receive and transmit data with the tag reader 40 at such frequencies or frequency ranges using the antenna 152. Further, the tag reader 40 may excite the tag 100 by an electromagnetic signal or field and, in turn, induce a potential difference in the antenna 152. The RF front end 150 may capture electric charge associated with this potential difference and provide it to the charge store 140. In this way, the charge store 140 may be recharged through the RF front end 150 by the tag reader 40. In embodiments of the tag 100 which omit the charge store 140, electric charge captured by the RF front end 150 may directly provide power for the operation of the tag 100. In this case, the tag 100 may operate only when excited by the tag reader 40.

The sensors 160 may include sensors and/or related circuitry configured to detect temperature, humidity, movement, acceleration, orientation, location, etc. In this context, the sensors 160 may include one or more thermometers, hygrometers, accelerometers, gyroscopes, global positioning system (GPS) sensors, etc., embodied in one or more nano- or micro-electromechanical system (NEMS or MEMS) devices and/or circuitry.

The sensors 160 may also include the continuity trace 180 (or multiple continuity traces 180). It should be appreciated, however, that the continuity trace 180 may be incorporated with the tag 100 as a component distinct from the sensors 160. For example, the continuity trace 180 may be electrically coupled to the tag processor 130 or integrated as part of the antenna 152. The continuity trace 180 may be incorporated into a product package in order to identity whether the product package has been opened or tampered with. In FIG. 4, the continuity trace 180 extends across an example access opening 182 of a product package. The continuity trace 180 may be embodied as a fine or thin conductive trace or filament which may be broken relatively easily under mechanical stress. The continuity trace 180 may be formed from any suitable conductive or semi-conductive material including metals, semiconductor materials, etc. In some embodiments, the continuity trace 180 may be formed from a material which exhibits a piezoresistive effect (i.e., change in resistance) due to changes in mechanical stress. The tag 100 may test for continuity, lack of continuity, or other changes in electrical characteristics (e.g., changes in resistance, capacitance, inductance, etc.) in the continuity trace 180 to identity whether a product package has been opened or tampered with. For example, the lack of continuity in the continuity trace 180 may indicate some likelihood that it has been broken due to opening the access opening 182. In contrast, continuity in the continuity trace 180 may indicate that the access opening 182 has not been opened.

In some embodiments, the tag 100 may be also configured to evaluate the electrical characteristics of the antenna 152 as a measure or indicator of the manipulation of a product package. For example, the antenna 152 may be provided over a vacuum-sealed cap of a bottle or other container. Once the vacuum-sealed cap has been removed, the vacuum within the container may be broken and the vacuum-sealed cap may "pop" or deform partly in shape. This deformation or change in shape may cause the electrical characteristics of the antenna 152 to change because of varied mechanical stress on the antenna 152, for example. In turn, the tag 100 may detect this change in electrical characteristics to identify that the bottle has been opened.

The display 170 may be embodied as any suitable type of display device including associated circuitry. In preferred embodiments, the display 170 may be embodied as an electronic ink-type display, for reduced power consumption. In other embodiments, the display 170 may be embodied as a liquid crystal display (LCD), light emitting diode (LED), or organic light emitting diode (OLED) display, for example. As further described below, the tag 100 may direct the display 170 to visually present information such as a timing or date upon which a product package was opened or a use-by date associated with a product within the product package, among other information. In various embodiments, the display 170 may be integrated with or separate from the tag 100.

The tag memory 120 may be embodied as any suitable type of memory device or circuitry. The tag memory 120 may store data for the tag 100, including but not limited to a unique identifier 122, product detail data 124, and product usage data 126. The unique identifier 122 may be embodied as any type of unique data identifier that provides a one-to-one correspondence between the tag 100 and an associated product package. The unique identifier 122 may be globally unique, such as a serial number of the tag 100, or may correspond to a stock keeping unit (SKU) number for a product or product package, a universal product code (UPC) number for a product, or other identifier. The product detail data 124 may include information related to a product or product package, such as a product name or type, product trade name or mark, or product characteristics. The product characteristics may include nutritional information, product disposal or usage information, recommended or required storage condition information (e.g., temperature, humidity, etc.), current storage condition information, volume or weight information, etc. In some embodiments, the product characteristics may include use-by, sell-by, or other product expiration information. The product usage data 126 may include information related to whether a product package has been opened, the number of times the product package has been opened, a remaining amount of product within the product package, a timing associated with an expiration of the product, etc. Additional examples of the unique identifier 122, the product detail data 124, the product usage data 126, and the manner in which such information is used for tag-based monitoring and evaluation is described below.

Figure 5:
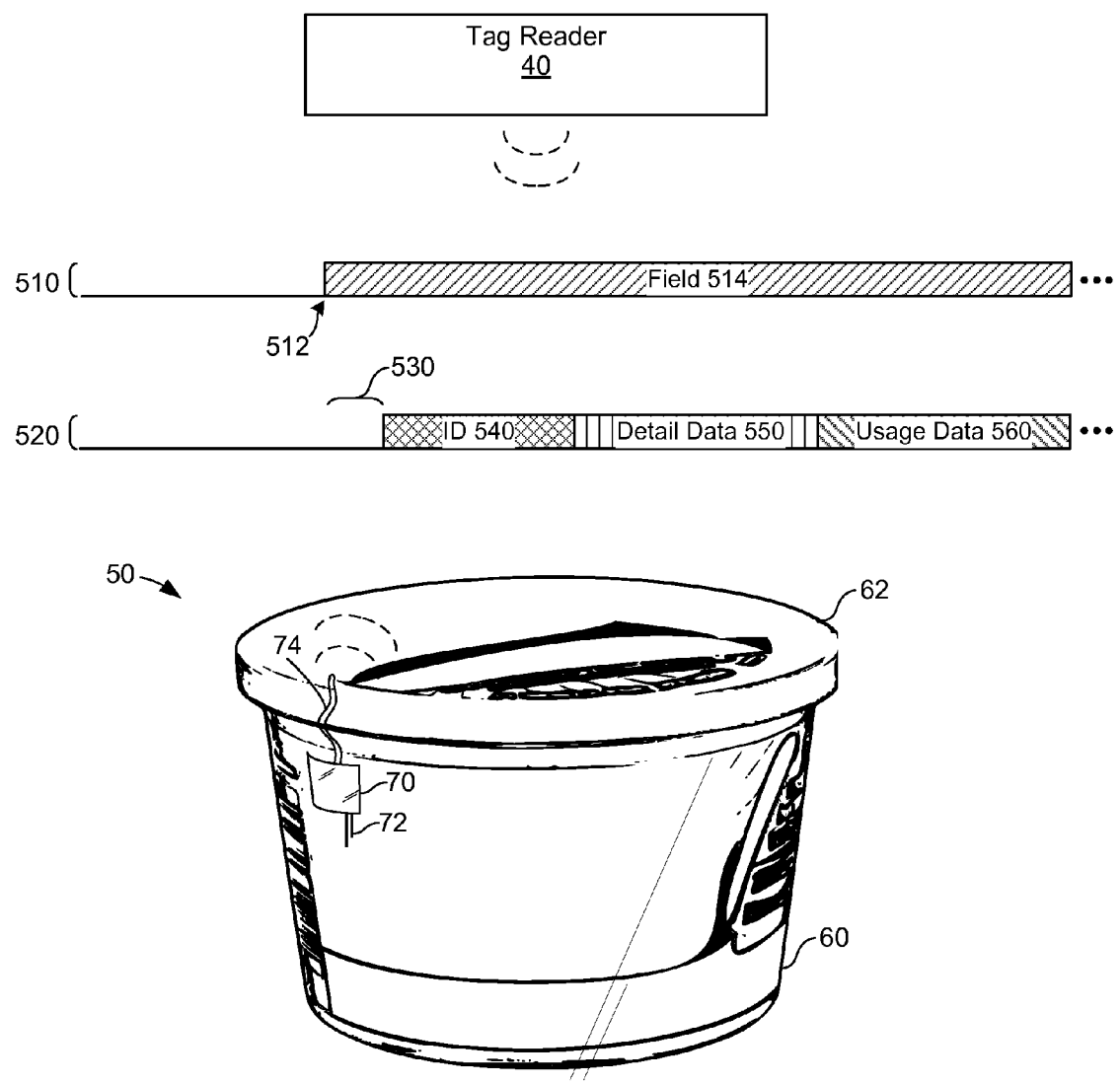
FIG. 5 illustrates an example timing diagram of signals communicated between the tag reader and the identification tag in FIG. 2A according to various embodiments of the present disclosure.

FIG. 5 illustrates an example timing diagram of signals communicated between the tag reader 40 and the identification tag 70 in FIG. 2A according to various embodiments of the present disclosure. In FIG. 5, the timing line 510 is representative of signals communicated by the tag reader 40 and received by the tag 70, and the timing line 520 is representative of signals communicated by the tag 70 and received by the tag reader 40. Starting at the timing 512, the tag reader 40 provides the electromagnetic field 514 to excite the tag 70. Depending upon the operating characteristics of the tag reader 40 and/or the tag 70, the electromagnetic field 514 may be embodied as a field at any suitable frequency and power level to excite the tag 70. At timing 530 after the timing 512, the tag 70 responds to the tag reader 40 with a modulated electromagnetic field including a unique identifier 540, product detail data 550, and product usage data 560.

As described above, the unique identifier 540 may include any type of unique data identifier that provides a one-to-one correspondence between the tag 70 and the product package 50 (or the product within the product package 50). The unique identifier 540 may be globally unique, such as a serial number of the tag 70, or may correspond to a stock keeping unit (SKU) number for the product package 50, a universal product code (UPC) number for a product within the product package 50, or other identifier.

The product detail data 550 may include information related to the product package 50 or a product within the product package 50, such as a product name or type, product trade name or mark, or product characteristics. The product characteristics may include nutritional information, product disposal or usage information, recommended or required storage condition information (e.g., temperature, humidity, etc.), current storage condition information, volume or weight information, etc. In some embodiments, the product characteristics may include use-by, sell-by, or other product expiration information. The product usage data 560 may include information related to whether the product package 50 has been opened, the number of times the product package 50 has been opened, a remaining amount of product within the product package 50, a timing associated with an expiration of the product, etc. For example, the product usage data 560 may include an indicator as to whether the continuity trace 74 has been broken. That is, the product usage data 560 may include an indicator as to whether the lid 62 of the product package 50 has been opened or tampered with based on the continuity, lack of continuity, or other electrical characteristic of the continuity trace 74. Further, the product usage data 560 may include a timing at which the continuity of the trace 74 was been broken.

It should be appreciated that the diagram in FIG. 5 is provided by way of example. In other embodiments, the type, order, and/or timing of signals and data may vary from that illustrated. For example, one or more of the unique identifier 540, the product detail data 550, or the product usage data 560 may be omitted from the signals communicated by the tag 70 to the tag reader 40. Further, one or more of the unique identifier 540, the product detail data 550, or the product usage data 560 may be repeated over time while the electromagnetic field 514 is provided by the tag reader 40.

In some embodiments, one or more tags such as those illustrated in FIGS. 1, 2A-C, and 3 may be used in a larger system for tag-based product monitoring and evaluation. In such a system, information about products and/or product packages may be sensed, gathered, monitored, and evaluated over time. For example, in the setting of a retail store or fulfillment center, where tags have been incorporated into product packages as described herein, the tags may be interrogated using a tag reader to identify whether the product packages have been opened or tampered with, whether the associated products have expired, or whether the products have (or may have) spoiled, been damaged, or used. In this context, a description of a system for tag-based product monitoring and evaluation is provided below, followed by a discussion of the operation of the same.

Figure 6:
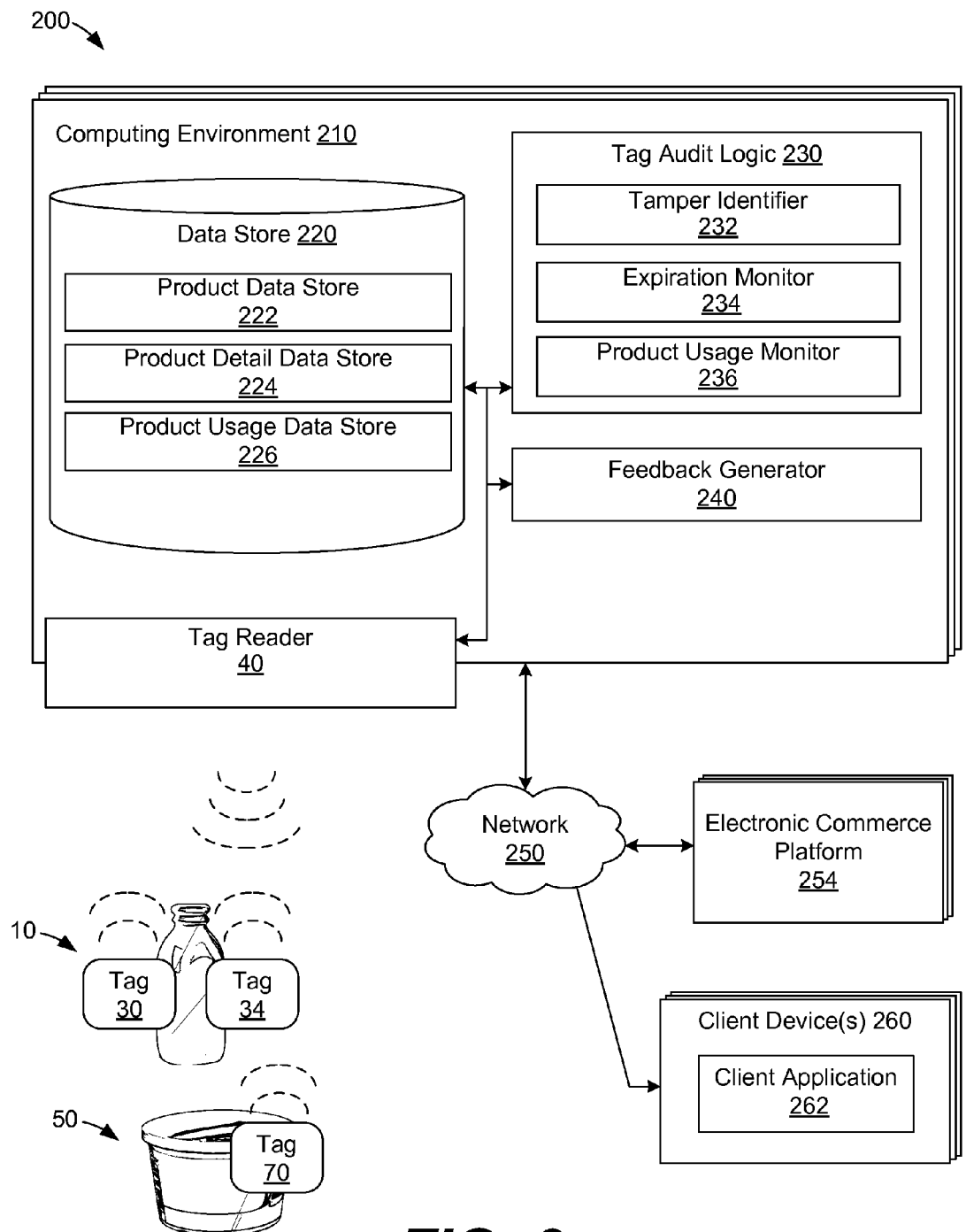
FIG. 6 illustrates an environment for tag-based product monitoring and evaluation according an example embodiment of the present disclosure.

FIG. 6 illustrates an environment 200 for tag-based product monitoring and evaluation according an example embodiment of the present disclosure. The networked environment 200 includes a computing environment 210, a network 250, an electronic commerce platform 254, a client device 260, and the product packages 10 and 50 including the tags 30, 34, and 70 from FIGS. 1 and 2A. As also illustrated, the computing environment 210 includes a data store 220, tag audit logic 230, feedback generator 240, and the tag reader 40 (see e.g., FIGS. 1, 2A-C, and 3-5). The data store 220 includes a product data store 222, a product detail data store 224, and a product usage data store 226. The tag audit logic 230 includes a tamper identifier 232, an expiration monitor 234, and a product usage monitor 236.

The computing environment 210 may be geographically located together with or apart from the electronic commerce platform 254, the client device 260, and the product packages 10 and 50. In other words, in various embodiments, the product packages 10 and 50 may be located at a fulfillment center, a brick-and-mortar store, a residence (e.g., in a pantry, refrigerator, etc.), at other locations, or distributed among various locations, and the computing environment 210 may be located apart from the product packages 10 and 50. In this case, so long as one or more tag readers similar to the tag reader 40 are located proximate to the product packages 10 and 50, information may be collected from the tags 30, 34, and 70 and relayed to the computing environment 210 via the network 250. Thus, it should be appreciated that, in one embodiment, the tag reader 40 may be coupled to the computing environment 210 by way of the network 250.

The computing environment 210 may be embodied as a computer, computing device, or computing system. In certain embodiments, the computing environment 210 may include one or more computing devices arranged, for example, in one or more server or computer banks. The computing device or devices may be located at a single installation site or distributed among different geographical locations. As further described below in connection with FIG. 11, the computing environment 210 may include a plurality of computing devices that together embody a hosted computing resource, a grid computing resource, and/or other distributed computing arrangement. In some cases, the computing environment 210 may be embodied as an elastic computing resource where an allotted capacity of processing, network, storage, or other computing-related resources varies over time. The computing environment 210 may also be embodied, in part, as various functional (e.g., computer-readable instruction) and/or logic (e.g., device, circuit, or processing circuit) elements that direct the computing environment 210 to perform aspects of the embodiments described herein.

The computing environment 210 may be configured to instruct the tag reader 40 to transmit an electromagnetic signal or field to excite, activate, and/or interrogate the tags 30, 34, and 70, among other tags. As discussed above, tags 30, 34, and 70 may reply with information stored on the tags 30, 34, and 70, such as unique identifiers, product detail, and product usage data, for example. Based on the reply from the tags 30, 34, and 70, the computing environment may be configured to identify products associated with the tags 30, 34, and 70. According to other aspects of the embodiments, the computing environment 210 may identify whether one or both of the product packages 10 and 50 have been opened with reference to the unique identifiers and/or product usage data received from the tags 30, 34, and 70.

The tag audit logic 230 of the computing environment 210 may be configured to direct the tag reader 40 to interrogate the tags 30, 34, and 70 at one or more predetermined times, periodically over time, or continuously over time. Referring to data returned from the tags 30, 34, and 70 in response to the interrogation (see, e.g., FIG. 5), the tag audit logic 230 may be configured to evaluate various aspects of the product packages 10 and 50 and/or the products contained within the product packages 10 and 50. For example, the tag audit logic 230 may be configured to identify the tags 30, 34, and 70, the product packages 10 and 50, and/or products associated with the product packages 10 and 50 and store this information in the product data store 222. Further, the tamper identifier 232 may be configured to determine whether one or both of the product packages 10 and 50 have been opened or tampered with and store this information in the product detail data store 224. In this context, the tamper identifier 232 may review certain product detail or usage data returned from the tags 30, 34, and 70 in response to an interrogation. One or more data fields within the product detail or usage data may identify that a product package has been opened or tampered with, along with a timing at which the product package was opened or tampered with.

The expiration monitor 234 may be configured to identify or calculate one or more dates (or timings) upon which the products in the product packages 10 and 50 are set to expire. In this context, the expiration monitor 234 may identify an expiration date based on product detail data returned from the tags 30, 34, and 70 in response to an interrogation. The product detail data may include an absolute (e.g., expiration on Jan. 1, 2014) or relative expiration date (e.g., expiration 10 days after opening) for one or both of the products in the product packages 10 and 50, and the expiration monitor 234 may be configured to identify and store such information in the product detail data store 224. In other aspects of the embodiments, the expiration monitor 234 may calculate timings at which the products in the product packages 10 and 50 will expire based on product detail data for the products and timings at which the product packages 10 and 50 were opened. In this case, with reference to product detail data received from the tag 70, the expiration monitor 234 may identify that the product in the product package 50 expires 10 days after opening and calculate an expiration date for the product based on a timing at which the product package 50 was opened. In other aspects, the expiration monitor 234 may identify that the product in the product package 50 has expired because a temperature data field in the product detail data indicates that the temperature of the product or the product package 50 has remained outside its recommended storage temperature for an extended period of time.

The product usage monitor 236 may be configured to evaluate the product detail and/or usage data received from the tags 30, 34, and 70 to determine product usage information, such as a number of times the product packages 10 and 50 have been accessed, moved, etc. This product usage information may be stored in the product usage data store 226.

The feedback generator 240 may be configured to review and process the data stored in the data store 220 to prepare feedback for review by individuals. The feedback may be presented in various forms, such as one or more lists, reports, charts, etc. As one type of feedback, the feedback generator 240 may be configured to generate a list of products that are expired and forward the list to an individual. The individual may access such list in the form of a network page or e-mail using the client device 260, for example. As other types of feedback, the feedback generator 240 may generate a list of products within a certain area, such as a refrigerator or pantry, a list of products that will expire within a certain period of time, a list of products that have been opened or tampered with, a list of products that have not been opened, a list of products that are relatively old, a list of products that are close to being used up, etc.

In some embodiments, the feedback generator 240 may reference information stored by the electronic commerce platform 254 when generating feedback. For example, the electronic commerce platform 254 may store a list of items regularly purchased by one or more individuals. The feedback generator 240 may compare a list of items identified using the tags 30, 34, and 70 (and others) with those items commonly purchased by the one or more individuals to make suggestions on items to purchase. Additionally or alternatively, the feedback generator 240 may automatically place an order for one or more products when it identifies that certain products are expired or are about to expire. In this way, the computing environment 210 may save time and effort.

The network 250 may include the Internet, intranets, extranets, wide area networks (WANs), local area networks (LANs), wired networks, wireless networks, cable networks, satellite networks, other suitable networks, or any combinations thereof. It is noted that the computing environment 210 may communicate with the client device 260 over various protocols such as hypertext transfer protocol (HTTP), simple object access protocol (SOAP), representational state transfer (REST), real-time transport protocol (RTP), real time streaming protocol (RTSP), real time messaging protocol (RTMP), user datagram protocol (UDP), internet protocol (IP), transmission control protocol (TCP), and/or other protocols for communicating data over the network 250, without limitation.

The electronic commerce platform 254 may be embodied as a computer, computing device, or computing system that operates as one or more electronic commerce platforms for selling goods or services. In certain embodiments, the electronic commerce platform 254 may be similar in composition to the computing environment 210, including one or more computing devices arranged, for example, in one or more server or computer banks. In various embodiments, the computing environment 210 may access the electronic commerce platform 254 by way of the network 250, or the electronic commerce platform 254 may be integrated with the computing environment 210.

The client device 260 is representative of one or a plurality of client devices of one or more users. The client device 260 may be embodied as any computing device or system, including but not limited to those embodied in the form of a desktop computer, a laptop computer, a personal digital assistant, a wearable computing device, a cellular telephone, a set-top box, a music or media player, or a tablet computer, among other example computing devices and systems. The client device 260 may also include various peripheral devices, for example. In this context, the peripheral devices may include input devices such as, for example, a keyboard, keypad, touch pad, touch screen, microphone, scanner, mouse, joystick, camera, or one or more buttons, etc. The peripheral devices may also include a display, indicator lights, speakers, etc., depending upon the primary use of the client device 260.

As illustrated in FIG. 6, the client device 260 may execute various applications, such as client application 262, which is representative of one application that may be executed on the client device 260. In one embodiment, the client application 262 may be embodied as a browser application that interacts with the computing environment 210 via the network 250. To this end, the client application 262 may be embodied as, for example, a commercially available hypertext-based internet browser such as Internet Explorer®, Firefox®, Chrome®, Silk®, or other browser or variant thereof, without limitation. Alternatively, the client application 262 may be embodied as one or more other applications that interact with the computing environment 210 using a suitable protocol via the network 250. Generally, when executed in the client device 260, the client application 262 renders a webpage or similar user interface on a display of the client device 260.

Figure 7:
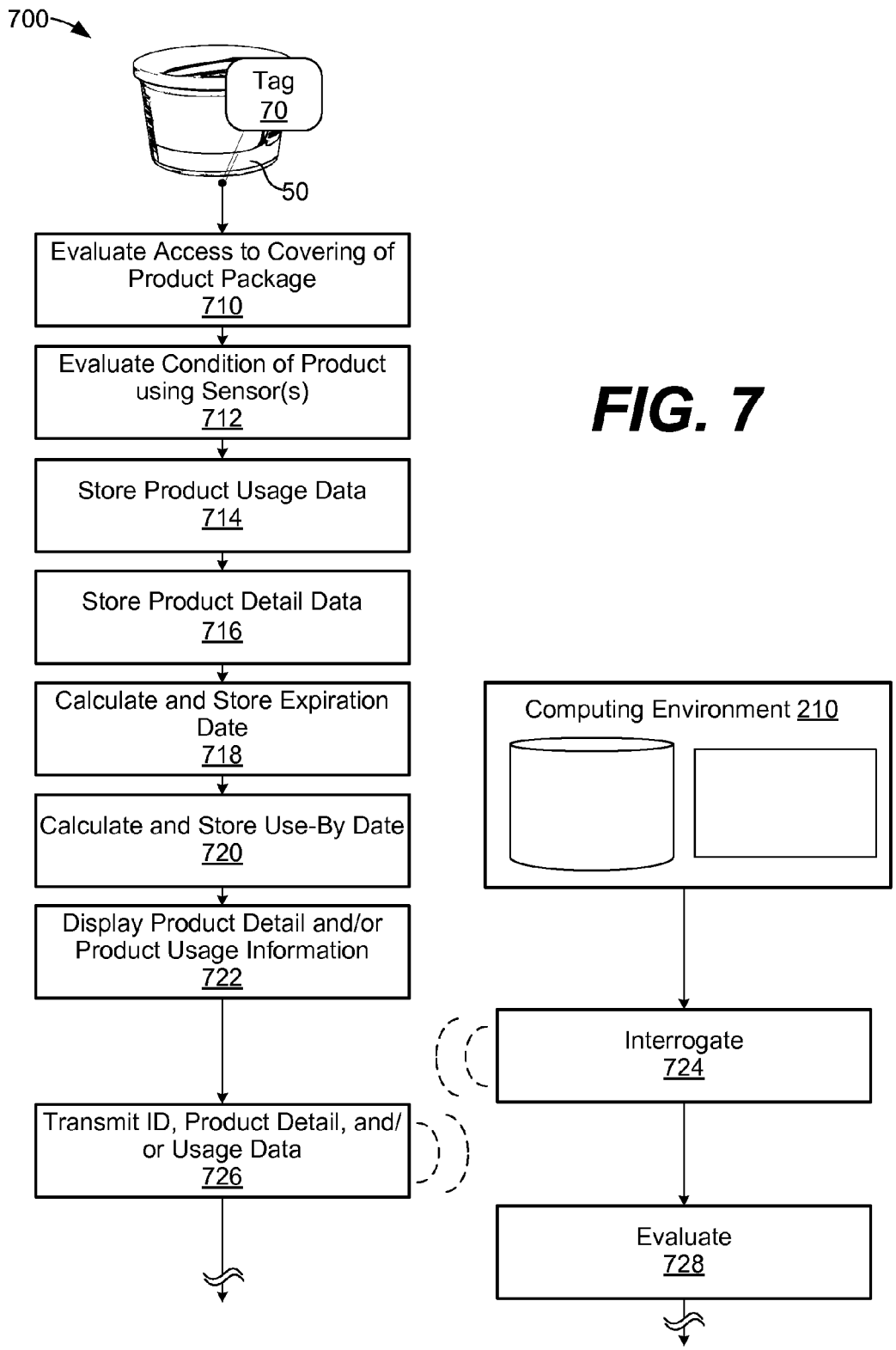
FIG. 7 illustrates an example flow diagram for a tag-based product monitoring and evaluation process performed with product package in FIG. 2A and the computing environment in FIG. 4.

FIG. 7 illustrates an example tag-based product monitoring and evaluation process 700 performed by the tag 70 of the product package 50 in FIG. 2A and the computing environment 210 in FIG. 6. Although the process 700 is described in connection with the tag 70 and the computing environment 210, other tags and computing environments may perform the process illustrated in FIG. 7. In certain aspects, the flowchart in FIG. 7 may be viewed as depicting an example group of steps performed by the tag 70 and the computing environment 210 according to one or more embodiments. It is noted that, many of the processes described as being performed on the tag 70 (or another tag) may, alternatively, be performed on the computing environment 210. For example, processes similar to those in FIG. 7 are also described below in the context of the computing environment 210 and with reference to FIG. 10.

As illustrated in FIG. 7, the process 700 includes evaluating access to a covering or access opening of the product package 10 at reference numeral 710. In this context, as described above with reference to FIG. 2A, the tag 70 may be configured to evaluate the continuity of the continuity trace 74 and identify whether the lid 62 (FIG. 2A) has been opened or tampered with based on the continuity. In other words, if an electrical coupling provided by the continuity trace 74 is broken or interrupted, the tag 70 may identify that the lid 62 has been opened or tampered with. At reference numeral 712, the process 700 includes evaluating a condition of the product in the product package 50. In this context, as described above, the tag 70 may include one or more sensors, such as temperature, humidity, and/or movement sensors, for example, and the tag 70 may use these sensors to evaluate the status or characteristics of the product and/or the product package 50.

At reference numerals 714 and 716, the process 700 includes storing the product usage and/or detail data sensed or gathered at reference numerals 710 and 712 in a memory of the tag 70. For example, based on the evaluation performed at reference numeral 710, the process 700 may include storing an indicator as to whether the lid 62 has been opened or tampered with as product usage data. A timing at which the lid 62 was opened or tampered with may also be stored by referencing clock 132, for example. Further, based on the evaluation performed at reference numeral 712, the process 700 may include storing various characteristics of the product in the product package 500, such as the temperature of the product or the product package 50 along with a timing at which the temperature was taken, for example.

At reference numerals 718 and 720, the process 700 includes calculating and storing an expiration and/or use-by date for the product in the product package 50. In this context, a processor of the tag 70 (e.g., similar to the tag processor 130 in FIG. 4) may identify the expiration or use-by date based on product detail data stored in the tag 70 and a timing at which the lid 62 was opened. The product detail data may include a relative expiration date (e.g., 10 days after opening) for the product in the product package 50, and the processor of the tag 70 may be configured to calculate a timing at which the product in the product package 50 will expire based on the product detail data and the timing at which the product package 50 was opened. In this case, with reference to product detail data received from the tag 70, the expiration monitor 234 may identify that the product in the product package 50 expires 10 days after opening and calculate an expiration date for the product based on a timing at which the product package 50 was opened. Similarly, the tag 70 may be configured to calculate use-by date based the on product detail data and the timing at which the product package 50 was opened.

At reference numeral 722, the process 700 includes displaying certain product detail or usage information on a display of the tag 70. For example, as described above with reference to FIGS. 2B and 2C. The tag 70 may include a display 76 which is electrically coupled to the tag 70. Thus, the tag 70 may provide product detail or usage information on the display 76 at reference numeral 722. The information may include the expiration date information calculated at reference numeral 718, sell-by date information as illustrated in FIG. 2B, or opened-on and/or use-by date information as illustrated in FIG. 2C, for example.

At reference numeral 724, the process 700 includes the computing environment 210 interrogating the tag 70. As noted above, the computing environment 210 may direct the tag reader 40 (FIG. 2A) to interrogate the tag 70 (and/or any other tags) at one or more predetermined times, periodically over time, or continuously over time. In response, at reference numeral 726, the process 700 includes the tag 70 transmitting a unique identifier for the product package 50, product detail data associated with the product in the product package 50, and/or product usage data associated with the product in the product package 50. In this product usage and detail data, among other data fields, the tag 70 may transmit an indicator as to whether the lid 62 of the product package 50 has been opened, a timing at which the lid 62 was opened, a temperature of the product or the product package 50, etc. At reference numeral 728, the process 700 includes the computing environment 210 evaluating the data transmitted by the tag 70.

Figure 8:
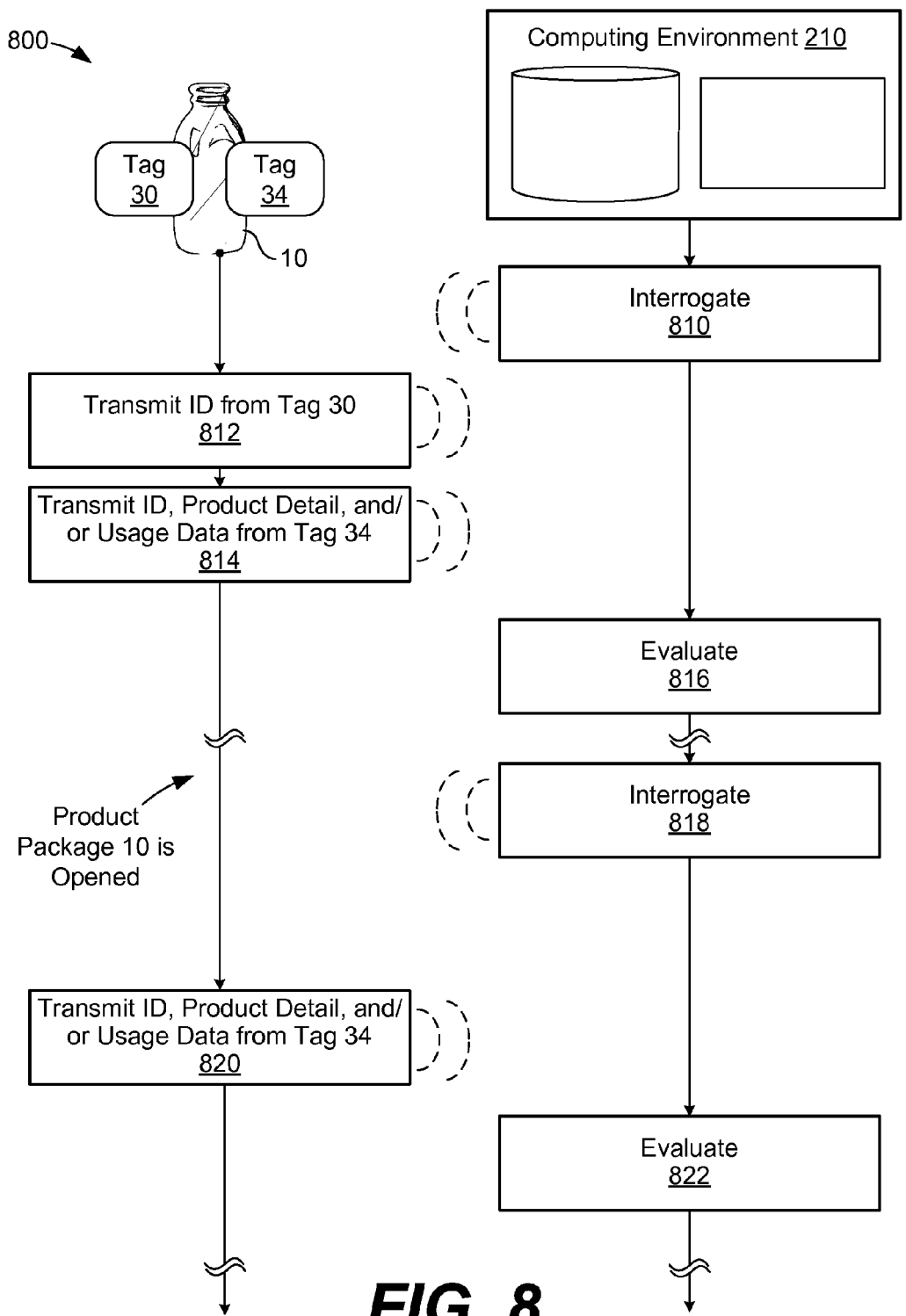
FIG. 8 illustrates an example flow diagram for a tag-based product monitoring and evaluation process performed with the product package in FIG. 1.

FIG. 8 illustrates an example flow diagram for a tag-based product monitoring and evaluation process 800 performed by the tags 30 and 34 of the product package 10 in FIG. 1 and the computing environment 210 in FIG. 6. Although the process 800 is described in connection with the tags 30 and 34 and the computing environment 210, other tags and computing environments may perform the process illustrated in FIG. 8. In certain aspects, the flowchart in FIG. 8 may be viewed as depicting an example group of steps performed by the tags 30 and 34 and the computing environment 210 according to one or more embodiments.

As described above, the product package 10 includes the tags 30 and 34. The antenna 32 of the tag 30 extends from the bottle 20 to the cap 22 (FIG. 1). At reference numeral 810, the process 800 includes the computing environment 210 interrogating the tags 30 and 34. As noted above, the computing environment 210 may direct the tag reader 40 (FIG. 1) to interrogate the tags 30 and 34 at one or more predetermined times, periodically over time, or continuously over time. At reference numeral 812, the process 800 includes the tag 30 transmitting a unique identifier for the product package 10 to the tag reader 40. Further, at reference numeral 814, the process 800 includes the tag 34 transmitting a unique identifier for the product package 10, product detail data associated with the product in the product package 10, and/or product usage data associated with the product in the product package 10. At reference numeral 816, the process 800 includes the computing environment 210 evaluating the data transmitted by the tags 30 and 34 at reference numerals 804 and 806.

At some time after reference numeral 814, the product package 10 is opened. For example, the cap 22 may be removed from the bottle 20 (FIG. 1). In the case that the cap 22 is removed from the bottle 20, then the antenna 32 of the tag 30 may be broken away from the tag 30, as described above, rendering the tag 30 incapable of operation. That is, if the antenna 32 is electrically disconnected from the tag 30, the tag 30 can no longer be interrogated or excited by electromagnetic signals or fields from the tag reader 40. As such, the tag 30 cannot respond to the tag reader 40.

Later in time, at reference numeral 818, the process 800 includes the computing environment 210 interrogating the tags 30 and 34 again. However, at reference numeral 820, the tag 34 responds but the tag 30 does not. At reference numeral 822, the process 800 includes the computing environment 210 evaluating the data transmitted by the tag 34 at reference numeral 820. At reference numeral 822, the tamper identifier 232 (FIG. 6) of the computing environment 210 may determine that the cap 22 of the bottle 20 has been removed because the tag 30 did not respond to the interrogation at reference numeral 818. In other words, the tamper identifier 232 may be configured to conclude that the cap 22 has been removed and/or that the product package 10 has been tampered with if the tag reader 40 receives a unique identifier from the tag 34 but not from the tag 30.

Figure 9:
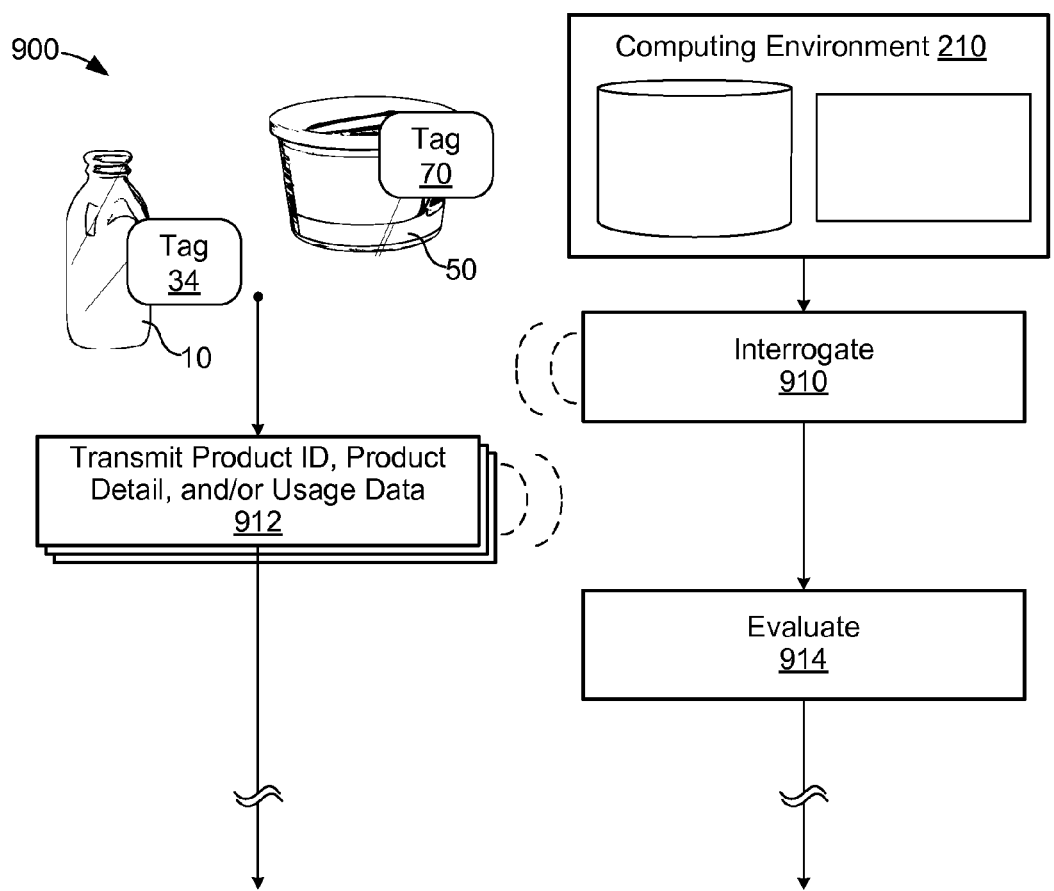
FIG. 9 illustrates an example flow diagram for a tag-based product monitoring and evaluation process performed with the product packages in FIGS. 1 and 2A and the computing environment in FIG. 4.

FIG. 9 illustrates an example flow diagram for a tag-based product monitoring and evaluation process 900 performed by the tags 34 and 70 of the product packages 10 and 50 in FIGS. 1 and 2A and the computing environment 210 in FIG. 6. Although the process 900 is described in connection with the tags 34 and 70 and the computing environment 210, other tags and computing environments may perform the process illustrated in FIG. 9. In certain aspects, the flowchart in FIG. 9 may be viewed as depicting an example group of steps performed by the tags 34 and 70 and the computing environment 210 according to one or more embodiments.

At reference numeral 910, the process 900 includes the computing environment 210 interrogating the tags 34 and 70. As noted above, the computing environment 210 may direct the tag reader 40 (FIGS. 1 and 2A) to interrogate the tags 34 and 70 at one or more predetermined times, periodically over time, or continuously over time. At reference numeral 912, the process 900 includes one or both of the tags 34 and 70 transmitting unique identifiers for the product packages 10 and 50, product detail data associated with the products in the product packages 10 and 50, and/or product usage data associated with the products in the product packages 10 and 50. It should be appreciated that the product detail and usage data transmitted at reference numeral 912 may have been previously sensed or gathered by the tags 34 and 70 during a process similar to the process 700 described above with reference to FIG. 7. Finally, at reference numeral 914, the process 900 includes evaluating the data transmitted by the tags 34 and 70 at reference numeral 912. More particularly, at reference numeral 914, the computing environment 210 may evaluate the data during the process 1000 described below with reference to FIG. 10.

Figure 10:
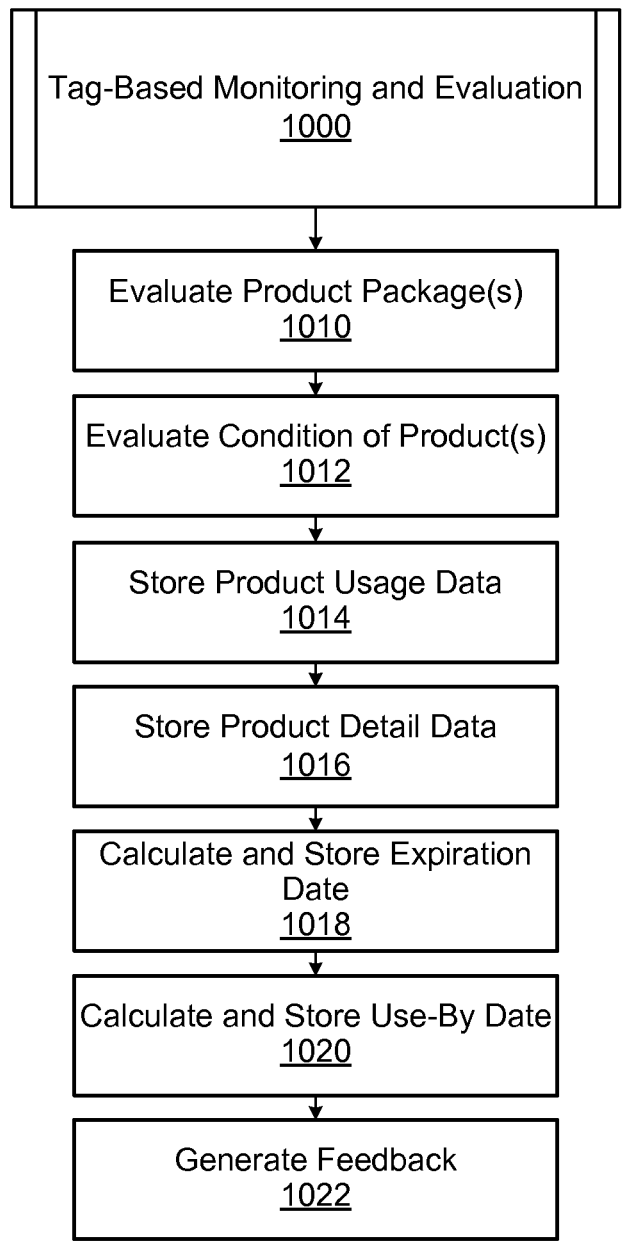
FIG. 10 illustrates an example flow diagram for a tag-based product monitoring and evaluation process performed by the computing environment in FIG. 6.

FIG. 10 illustrates an example flow diagram for a tag-based product monitoring and evaluation process 1000 performed by the computing environment 210 in FIG. 6. Although the process 1000 is described in connection with the computing environment 210, other computing environments may perform the process illustrated in FIG. 10. In certain aspects, the flowchart in FIG. 10 may be viewed as depicting an example group of steps performed by the computing environment 210 according to one or more embodiments.

In FIG. 10, it may be assumed that the computing environment 210 has received, from one or more tags, one or more unique identifiers, product detail data associated with products in product packages, and/or product usage data associated with the products in the product packages. At reference numeral 1010, the process 1000 includes evaluating the product packages with reference to the unique identifiers, the product detail data, and/or the product usage data. For example, with reference to the unique identifiers, the product detail data, and/or the product usage data, the computing environment 210 may be configured to identify one or more products or product packages. Additionally, the computing environment 210 may identify whether one or more of the product packages have been opened with reference to confluence in unique identifiers or other signals from tags and/or based on indicator fields in product usage data as described herein.

The product usage data may include information related to whether a product package has been opened, the number of times the product package has been opened, a remaining amount of product within the product package, a timing associated with an expiration of the product, etc. For example, the product usage data may include an indicator as to whether a continuity trace of a tag associated with a product package has been broken. Further, the product usage data may include a timing at which the continuity of the trace was been broken. All of these aspects (and others) may be evaluated by the computing environment 210 at reference numeral 1010.

At reference numeral 1012, the process 1000 includes evaluating the products in the product packages with reference to the product detail data and/or the product usage data. For example, the computing environment 210 may evaluate the product detail data to identify information related to a product within a product package, such as a product name or type, product trade name or mark, or product characteristics. The product characteristics may include nutritional information, product disposal or usage information, recommended or required storage condition information (e.g., temperature, humidity, etc.), current storage condition information, volume or weight information, etc. In some embodiments, the product characteristics may include use-by, sell-by, or other product expiration information. All of these aspects (and others) may be evaluated by the computing environment 210 at reference numeral 1012.

At reference numerals 1014 and 1016, the process 1000 includes storing, in the data store 220 (FIG. 6), the evaluations generated and data collected at reference numerals 1010 and 1012. For example, based on the evaluation performed at reference numeral 1010, the process 1000 may include storing an indicator as to whether access openings of one or more packages have been opened or tampered with. A timing at which individual ones of the access openings were opened or tampered with may also be stored. Further, based on the evaluation performed at reference numeral 1012, the process 1000 may include storing various characteristics of products, such as product temperatures, etc.

At reference numerals 1018 and 1020, the process 1000 includes calculating and storing one or more expiration and/or use-by dates for various products. That is, based on the product detail and/or usage data received by the computing environment 210, the expiration monitor 234 and/or the product usage monitor 236 (FIG. 6) may be configured to identify or calculate one or more dates (or timings) upon which products are set to expire at reference numeral 1018. The expiration monitor 234 and/or the product usage monitor 236 may identify an expiration date based on the product detail data received from one or more tags. The product detail data may include an absolute (e.g., expiration on Jan. 1, 2014) or relative expiration date (e.g., expiration 10 days after opening) for certain products. The expiration monitor 234 and/or the product usage monitor 236 may also be configured to calculate one or more timings at which products will expire based on the product detail data for the products and the timings at which the product packages for the products were opened. In this case, with reference to product detail data, the expiration monitor 234 and/or the product usage monitor 236 may identify that a product expires 10 days after it was opened and calculate an expiration date for the product based on the timing at which it was opened. Similarly, the expiration monitor 234 and/or the product usage monitor 236 may be configured to calculate one or more use-by dates for various products based the on product detail data and the timing at which product packages were opened. In other aspects, the expiration monitor 234 and/or the product usage monitor 236 may identify that a product has expired because a temperature data field associated with the product indicates that the temperature of the product or product package has remained outside its recommended storage temperature for an extended period of time.

At reference numeral 1022, the process 1000 includes generating feedback related to the product packages and/or products evaluated at reference numerals 1010 and 1012 and the calculations performed at reference numerals 1018 and 1020. As one example, the feedback may identify whether product packages have been opened, a timing at which the product packages have been opened, and an indication as to whether products are expired. In this context, the feedback generator 240 (FIG. 6) of the computing environment 210 may be configured to review and process the data stored in the data store 220 to prepare feedback for review by individuals. The feedback may be presented in various forms, such as one or more lists, reports, charts, etc. As one type of feedback, the feedback generator 240 may be configured to generate a list of products that are expired and forward the list to an individual. The individual may access such list in the form of a network page or e-mail using the client device 260, for example. As other types of feedback, the feedback generator 240 may generate a list of products within a certain area, such as a refrigerator or pantry, a list of products that will expire within a certain period of time, a list of products that have been opened or tampered with, a list of products that have not been opened, a list of products that are relatively old, a list of products that are close to being used up, etc.

Figure 11:
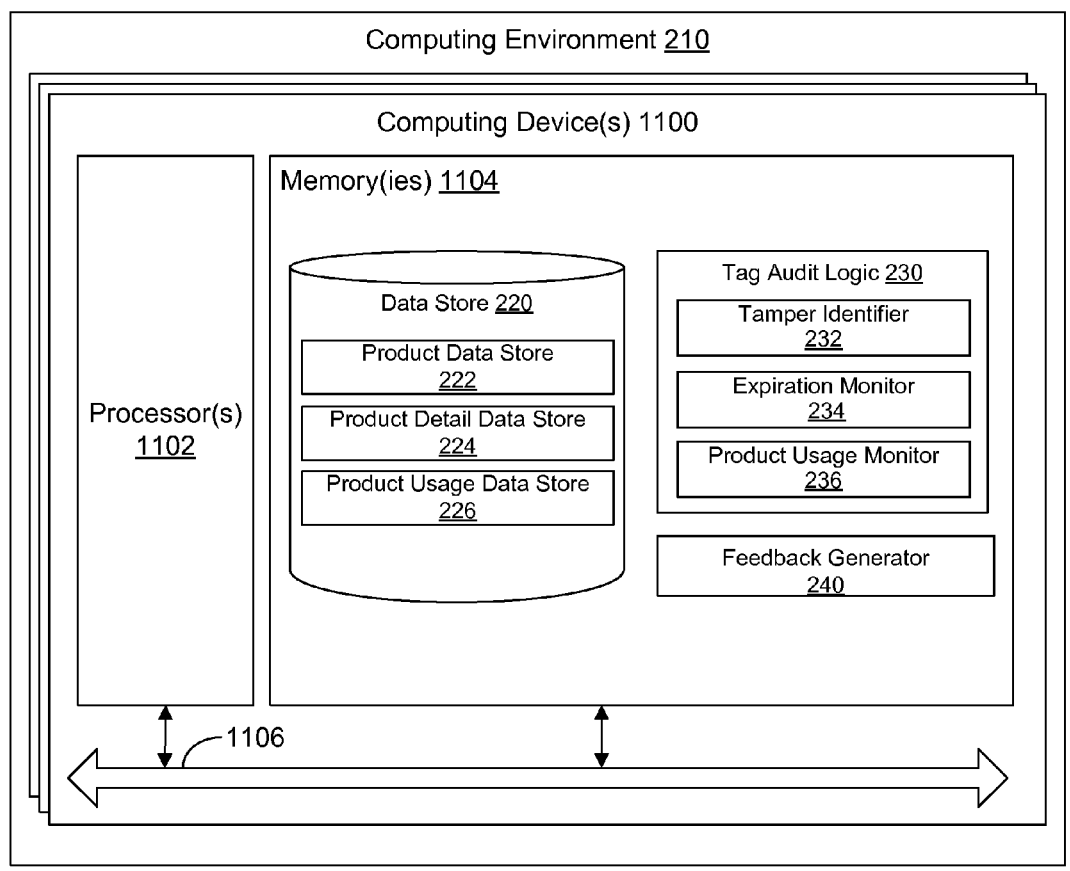
FIG. 11 illustrates an example schematic block diagram of the computing environment employed in the networked environment of FIG. 6 according to various embodiments of the present disclosure.

FIG. 11 illustrates an example schematic block diagram of the computing environment 210 employed in the networked environment 200 in FIG. 2 according to various embodiments of the present disclosure. The computing environment 210 includes one or more computing devices 1100. Each computing device 1100 includes at least one processing system, for example, having a processor 1102 and a memory 1104, both of which are electrically and communicatively coupled to a local interface 1106. To this end, each computing device 1100 may be embodied as, for example, at least one server computer or similar device. The local interface 1106 may be embodied as, for example, a data bus with an accompanying address/control bus or other bus structure as can be appreciated.

In various embodiments, the memory 1104 stores data and software or executable-code components executable by the processor 1102. For example, the memory 1104 may store executable-code components associated with the tag audit logic 230 for execution by the processor 1102. The memory 1104 may also store data such as that stored in the data store 220, among other data.

It should be understood and appreciated that the memory 1104 may store other executable-code components for execution by the processor 1102. For example, an operating system may be stored in the memory 1104 for execution by the processor 1102. Where any component discussed herein is implemented in the form of software, any one of a number of programming languages may be employed such as, for example, C, C++, C#, Objective C, JAVA®, JAVASCRIPT®, Perl, PHP, VISUAL BASIC®, PYTHON®, RUBY, FLASH®, or other programming languages.

As discussed above, in various embodiments, the memory 1104 stores software for execution by the processor 1102. In this respect, the terms "executable" or "for execution" refer to software forms that can ultimately be run or executed by the processor 1102, whether in source, object, machine, or other form. Examples of executable programs include, for example, a compiled program that can be translated into a machine code format and loaded into a random access portion of the memory 1104 and executed by the processor 1102, source code that can be expressed in an object code format and loaded into a random access portion of the memory 1104 and executed by the processor 1102, or source code that can be interpreted by another executable program to generate instructions in a random access portion of the memory 1104 and executed by the processor 1102, etc. An executable program may be stored in any portion or component of the memory 1104 including, for example, a random access memory (RAM), read-only memory (ROM), magnetic or other hard disk drive, solid-state, semiconductor, or similar drive, universal serial bus (USB) flash drive, memory card, optical disc (e.g., compact disc (CD) or digital versatile disc (DVD)), floppy disk, magnetic tape, or other memory component.

In various embodiments, the memory 1104 may include both volatile and nonvolatile memory and data storage components. Volatile components are those that do not retain data values upon loss of power. Nonvolatile components are those that retain data upon a loss of power. Thus, the memory 1104 may include, for example, a RAM, ROM, magnetic or other hard disk drive, solid-state, semiconductor, or similar drive, USB flash drive, memory card accessed via a memory card reader, floppy disk accessed via an associated floppy disk drive, optical disc accessed via an optical disc drive, magnetic tape accessed via an appropriate tape drive, and/or other memory component, or any combination thereof. In addition, the RAM may include, for example, a static random access memory (SRAM), dynamic random access memory (DRAM), or magnetic random access memory (MRAM), and/or other similar memory device. The ROM may include, for example, a programmable read-only memory (PROM), erasable programmable read-only memory (EPROM), electrically erasable programmable read-only memory (EEPROM), or other similar memory device.

Also, the processor 1102 may represent multiple processors 1102 and/or multiple processor cores and the memory 1104 may represent multiple memories that operate in parallel, respectively, or in combination. Thus, the local interface 1106 may be an appropriate network or bus that facilitates communication between any two of the multiple processors 1102, between any processor 1102 and any of the memories 1104, or between any two of the memories 1104, etc. The local interface 1106 may include additional systems designed to coordinate this communication, including, for example, a load balancer that performs load balancing. The processor 1102 may be of electrical or of some other available construction.

As discussed above, the tag audit logic 230 may be embodied, in part, by software or executable-code components for execution by general purpose hardware. Alternatively the same may be embodied in dedicated hardware or a combination of software, general, specific, and/or dedicated purpose hardware. If embodied in such hardware, each can be implemented as a circuit or state machine, for example, that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowchart or process diagrams of FIGS. 7-10 are representative of certain processes, functionality, and operations of embodiments discussed herein. Each block may represent one or a combination of steps or executions in a process. Alternatively or additionally, each block may represent a module, segment, or portion of code that includes program instructions to implement the specified logical function(s). The program instructions may be embodied in the form of source code that includes human-readable statements written in a programming language or machine code that includes numerical instructions recognizable by a suitable execution system such as the processor 1102. The machine code may be converted from the source code, etc. Further, each block may represent, or be connected with, a circuit or a number of interconnected circuits to implement a certain logical function or process step.

Although the flowchart or process diagrams of FIGS. 7-10 illustrate a certain order, it is understood that the order may differ from that which is depicted. For example, an order of execution of two or more blocks may be scrambled relative to the order shown. Also, two or more blocks shown in succession in FIGS. 7-10 may be executed concurrently or with partial concurrence. Further, in some embodiments, one or more of the blocks shown in FIGS. 7-10 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the tag audit logic 230 that are embodied, at least in part, by software or executable-code components, may be embodied or stored in any tangible or non-transitory computer-readable medium or device for execution by an instruction execution system such as a general purpose processor. In this sense, the logic may be embodied as, for example, software or executable-code components that can be fetched from the computer-readable medium and executed by the instruction execution system. Thus, the instruction execution system may be directed by execution of the instructions to perform certain processes such as those illustrated in FIGS. 7-10. In the context of the present disclosure, a "computer-readable medium" can be any tangible medium that can contain, store, or maintain any logic, application, software, or executable-code component described herein for use by or in connection with an instruction execution system.

The computer-readable medium can include any physical media such as, for example, magnetic, optical, or semiconductor media. More specific examples of suitable computer-readable media include, but are not limited to, magnetic tapes, magnetic floppy diskettes, magnetic hard drives, memory cards, solid-state drives, USB flash drives, or optical discs. Also, the computer-readable medium may include a RAM including, for example, an SRAM, DRAM, or MRAM. In addition, the computer-readable medium may include a ROM, a PROM, an EPROM, an EEPROM, or other similar memory device.

Further, any logic or application(s) described herein, including the adaptive topic logic, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device, or in multiple computing devices in the same computing environment 210. Additionally, it is understood that terms such as "application," "service," "system," "engine," "module," and so on may be interchangeable and are not intended to be limiting.

Disjunctive language, such as the phrase "at least one of X, Y, or Z," unless specifically stated otherwise, is used in general to present that an item, term, etc., may be either X, Y, or Z, or any combination thereof (e.g., X, Y, and/or Z). Thus, such disjunctive language is not generally intended to, and should not imply that, certain embodiments require at least one of X, at least one of Y, and at least one of Z to be each present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, at least the following is claimed:

1. A non-transitory computer-readable medium embodying a program that, when executed by at least one computing device, directs the at least one computing device to perform a method comprising:

instructing, by the at least one computing device, a radio frequency identification (RFID) tag reader to transmit an electromagnetic field;

receiving, by the at least one computing device, at least one unique identifier from a plurality of RFID tags in response to the electromagnetic field, the plurality of RFID tags being provided on a product package for a product;

identifying, by the at least one computing device, the product using the at least one unique identifier;

detecting, by the at least one computing device, whether the product package has been opened based at least in part on a confluence of at least two unique identifiers received from the plurality of RFID tags;

storing, by the at least one computing device, a timing associated with whether the product package has been opened; and determining, by the at least one computing device, whether the product has expired based at least in part on the timing.

2. The non-transitory computer-readable medium of claim 1, wherein the method further comprises:

receiving, by the at least one computing device, product detail data from at least one of the plurality of RFID tags in response to the electromagnetic field; and determining, by the at least one computing device, whether the product has expired based at least in part on the product detail data.

3. The non-transitory computer-readable medium of claim 1, wherein the method further comprises:

generating, by the at least one computing device, feedback on the product, wherein the feedback identifies at least one of whether the product package has been opened, the timing at which the product package has been opened, and an indication as to whether the product has expired.

4. A system, comprising:
at least one computing device; and
an application stored in a memory that, when executed in the at least one computing device, directs the at least one computing device to perform a method comprising:
instructing a radio frequency identification (RFID) tag reader to transmit an electromagnetic field;
receiving at least one unique identifier from at least one of a plurality of RFID tags provided on a product package for a product in response to the electromagnetic field;
identifying the product using the at least one unique identifier; and
detecting whether the product package of the product has been opened based at least in part on a confluence of responses from at least two of the plurality of RFID tags.

5. The system of claim 4, wherein the method further comprises:
storing a timing associated with whether the product package has been opened; and
determining whether the product has expired based at least in part on the timing.

6. The system of claim 4, wherein the method further comprises:
receiving product detail data for the product from at least one of the plurality of RFID tags in response to the electromagnetic field.

7. The system of claim 6, wherein the method further comprises:
determining whether the product has expired based at least in part on the product detail data.

8. The system of claim 6, wherein the method further comprises:
identifying a number of times the product package has been opened with reference to a packaging indicator in the product detail data.

9. The system of claim 8, wherein the method further comprises:
monitoring usage of the product based at least in part on the product detail data.

10. The system of claim 4, wherein the method further comprises:
generating a report for the product.

11. The system of claim 10, wherein the report for the product identifies whether the product package has been opened.

12. The system of claim 10, wherein the report for the product identifies whether the product has expired.

13. A method, comprising:
instructing, by at least one computing device, a radio frequency identification (RFID) tag reader to transmit an electromagnetic field;
receiving, by the at least one computing device, product detail data from at least one of a plurality of RFID tags provided on a product package for a product in response to the electromagnetic field;
receiving, by the at least one computing device, a plurality of unique identifiers from at least two of the plurality of RFID tags;
identifying, by the at least one computing device, the product using the product detail data; and
detecting, by the at least one computing device, whether the product package of the product has been opened based at least in part on a confluence of the plurality of unique identifiers.

14. The method of claim 13, further comprising:
storing, by the at least one computing device, a timing associated with whether the product package has been opened; and
determining, by the at least one computing device, whether the product has expired based at least in part on the timing.

15. The method of claim 13, further comprising:
detecting, by the at least one computing device, whether the product package has been opened with reference to a packaging indicator in the product detail data.

16. The method of claim 13, further comprising:
determining, by the at least one computing device, whether the product has expired based at least in part on the product detail data.

17. The method of claim 13, further comprising:
identifying, by the at least one computing device, a number of times the product package has been opened with reference to a packaging indicator in the product detail data.

18. The method of claim 13, further comprising:
generating, by the at least one computing device, a report for the product, wherein the report identifies at least one of: an indication of whether the product package has been opened, a timing at which the product package has been opened, or an indication as to whether the product has expired.

19. A system, comprising:
at least one computing device; and
an application stored in a memory that, when executed in the at least one computing device, directs the at least one computing device to perform a method comprising:
instructing a radio frequency identification (RFID) tag reader to transmit an electromagnetic field;
receiving at least one unique identifier from at least one RFID tag in response to the electromagnetic field, the at least one RFID tag being provided on a product package for a product;
identifying the product using the at least one unique identifier;
receiving product detail data for the product from the at least one RFID tag in response to the electromagnetic field; and
identifying a number of times the product package has been opened with reference to a packaging indicator in the product detail data.

20. The system of claim 19, wherein the method further comprises:
determining whether the product has expired based at least in part on at least one of the product detail data or the number of times the product package has been opened.

21. The system of claim 19, wherein the method further comprises:
monitoring usage of the product based at least in part on at least one of the product detail data or the number of times the product package has been opened.

22. The system of claim 19, wherein the method further comprises:
generating a report for the product, wherein the report identifies at least one of: an indication of whether the product package has been opened, a timing at which the product package has been opened, or an indication as to whether the product has expired.

23. A method, comprising:
- instructing, by at least one computing device, a radio frequency identification (RFID) tag reader to transmit an electromagnetic field;
- receiving, by at least one computing device, product detail data from at least one RFID tag in response to the electromagnetic field, the at least one RFID tag being provided on a product package for a product;
- identifying, by the at least one computing device, the product using the product detail data; and
- identifying, by the at least one computing device, a number of times the product package has been opened with reference to a packaging indicator in the product detail data.

24. The method of claim 23, further comprising:
- determining, by the at least one computing device, whether the product has expired based at least in part on at least one of the product detail data or the number of times the product package has been opened.

25. The method of claim 23, further comprising:
- monitoring, by the at least one computing device, usage of the product based at least in part on at least one of the product detail data or the number of times the product package has been opened.

26. The method of claim 23, further comprising:
- generating, by at least one computing device, a report for the product, wherein the report identifies at least one of: an indication of whether the product package has been opened, a timing at which the product package has been opened, or an indication as to whether the product has expired.

* * * * *